United States Patent
Kale et al.

(10) Patent No.: US 11,093,766 B1
(45) Date of Patent: Aug. 17, 2021

(54) DETECT AND ALERT OF FORGOTTEN ITEMS LEFT IN A VEHICLE

(71) Applicant: Micron Technology, Inc., Boise, ID (US)

(72) Inventors: Poorna Kale, Folsom, CA (US); Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/840,244

(22) Filed: Apr. 3, 2020

(51) Int. Cl.
| | |
|---|---|
| *G08B 21/22* | (2006.01) |
| *B60R 11/04* | (2006.01) |
| *B60Q 5/00* | (2006.01) |
| *G06K 9/00* | (2006.01) |
| *G08B 21/24* | (2006.01) |
| *G06N 3/08* | (2006.01) |
| *G06T 7/73* | (2017.01) |

(52) U.S. Cl.
CPC ........... *G06K 9/00838* (2013.01); *B60Q 5/00* (2013.01); *B60R 11/04* (2013.01); *G06N 3/08* (2013.01); *G06T 7/74* (2017.01); *G08B 21/22* (2013.01); *G08B 21/24* (2013.01); *B60R 2300/8013* (2013.01); *G06T 2207/30252* (2013.01); *G06T 2207/30268* (2013.01)

(58) Field of Classification Search
CPC .................................................. G06K 9/00838
See application file for complete search history.

(56) References Cited

U.S. PATENT DOCUMENTS

| | | | | |
|---|---|---|---|---|
| 9,123,244 | B2 * | 9/2015 | Daman | B60R 1/00 |
| 9,327,645 | B2 * | 5/2016 | Raman | B60Q 9/00 |
| 9,467,825 | B2 * | 10/2016 | Slay, Jr. | H04W 4/023 |
| 9,734,699 | B2 * | 8/2017 | Wassef | B60Q 9/008 |
| 9,805,580 | B2 * | 10/2017 | Schroeder | B60L 53/60 |
| 9,852,606 | B1 | 12/2017 | Heier et al. | |
| 10,507,793 | B1 | 12/2019 | De Moura Partika | |
| 2004/0130442 | A1 * | 7/2004 | Breed | G02B 27/01 |
| | | | | 340/443 |
| 2008/0144944 | A1 * | 6/2008 | Breed | G06K 9/00832 |
| | | | | 382/224 |
| 2009/0324010 | A1 | 12/2009 | Hou | |
| 2014/0218529 | A1 | 8/2014 | Mahmoud et al. | |
| 2014/0277935 | A1 * | 9/2014 | Daman | B60N 2/28 |
| | | | | 701/36 |
| 2015/0061856 | A1 * | 3/2015 | Raman | G08B 21/24 |
| | | | | 340/457 |

(Continued)

OTHER PUBLICATIONS

Shafiee, et al. "ISSAC: A Convolutional Neural Network Accelerator with In-Situ Analog Arithmetic in Crossbars," IEEE, Oct. 5, 2016.

*Primary Examiner* — Irfan Habib

(74) *Attorney, Agent, or Firm* — Greenberg Traurig

(57) ABSTRACT

Systems, methods and apparatuses to detect an item left in a vehicle and to generate an alert about the item. For example, a camera configured in a vehicle can be used to monitor an item associated with a user of the vehicle. The item as in an image from the camera can be identified and recognized using an artificial neural network. In response to a determination that the item recognized in the image is left in the vehicle after the user has exited the vehicle, an alert is generated to indicate that an item is in the vehicle but the user is leaving the vehicle.

23 Claims, 10 Drawing Sheets

(56) References Cited

U.S. PATENT DOCUMENTS

| | | |
|---|---|---|
| 2016/0318476 A1* | 11/2016 | Cogill ................... B60R 25/403 |
| 2017/0101110 A1* | 4/2017 | Yoo ....................... B60R 25/245 |
| 2018/0079388 A1 | 3/2018 | Andrews |
| 2018/0081357 A1 | 3/2018 | Datta Gupta et al. |
| 2018/0272992 A1* | 9/2018 | Gage .................. G06K 9/00979 |
| 2018/0290551 A1 | 10/2018 | Jones et al. |
| 2019/0095714 A1* | 3/2019 | Wilcox ................... G01S 17/89 |
| 2020/0202699 A1 | 6/2020 | Barth et al. |
| 2020/0293796 A1 | 9/2020 | Sajjadi Mohammadabadi et al. |
| 2020/0327315 A1 | 10/2020 | Mullins |

\* cited by examiner

DETECT AND ALERT OF FORGOTTEN ITEMS LEFT IN A VEHICLE

FIELD OF THE TECHNOLOGY

At least some embodiments disclosed herein relate to vehicles in general and more particularly, but not limited to, detection of items left in a vehicle.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide systems, methods and apparatus to detect that a user of a vehicle has brought an item into the vehicle but forgotten to remove the item from the vehicle upon exiting the vehicle.

For example, a user may bring a child, a suitcase, or another item into the vehicle and travel in the vehicle from one location to another. Upon arriving at the destination, the user may leave the vehicle and forget to take the child, the suitcase, or another item from the vehicle. Leaving the child in the vehicle can endanger the life of the child, especially when the temperature in the vehicle can rise during a hot day; and items left/forgotten in a vehicle may lead to the loss of property, and/or the inconvenience of having to coming back to the vehicle to retrieve the items.

Figure 1:
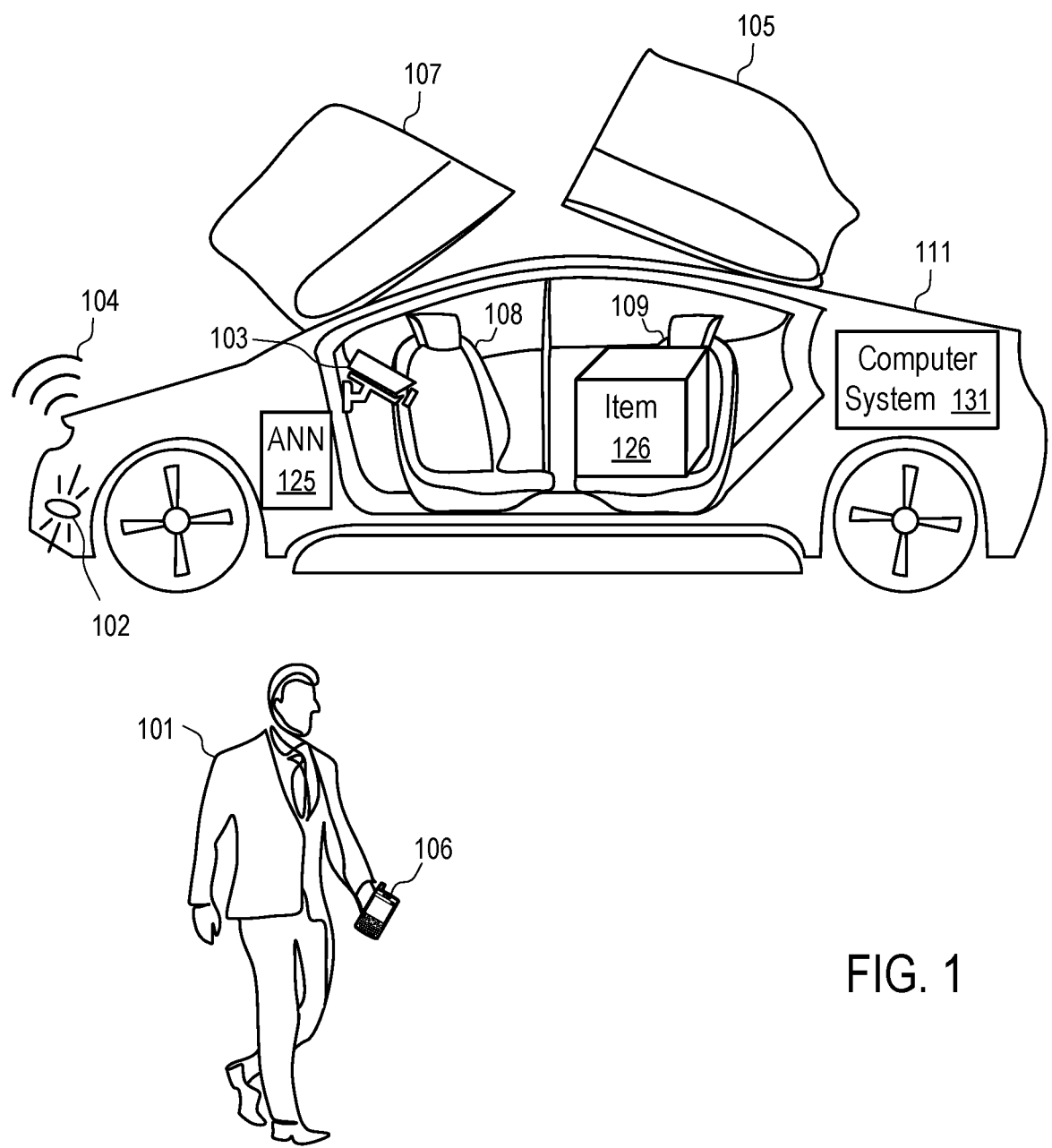
FIG. 1 shows a vehicle configured to detect that a user leaves an item in the vehicle upon exiting the vehicle according to one embodiment.

FIG. 1 shows a vehicle (111) configured to detect that a user (101) leaves an item (126) in the vehicle (111) upon exiting the vehicle (111) according to one embodiment.

In FIG. 1, the vehicle (111) has one or more cameras (e.g., 103) configured to monitor a user (101) of the vehicle (111) and items (e.g., 126) associated with the user (101), such as a kid, a pet, a briefcase, a luggage, a backpack, a tote/shopping bag, a box, a computer, a cellular phone, a wallet, a coat, etc.

The vehicle (111) has an artificial neural network (125) configured to recognize, in images from the camera(s) (e.g., 103), items that are likely to travel with users of vehicles (111). For example, users are likely to travel in vehicles with kids, pets, briefcases, luggage, bags, boxes, mobile computers, smartphones, purses, wallets, etc.

In some instances, a user (101) may bring an item into the vehicle (111) but forget to take the item (126) upon exiting the vehicle (111).

A computer system (131) of the vehicle (111) is configured to use the camera(s) (103) and the artificial neural network (125) to detect an item (126) brought onboard into the vehicle (111) by the user (101) but left behind in the vehicle (111) after the user (101) exits the vehicle, and closes and/or locks the door (e.g., 105 and/or 107).

Once the computer system (131) determines that the user has left behind an item (126) in the vehicle (111), the computer system (131) can cause the vehicle (111) to generate an alert. The alert can be provided using a horn of the vehicle (111), using an infotainment system of the vehicle (111), and/or via a message to a mobile device (106) of the user (101), such as a mobile phone (e.g., 106) of the user (101).

For example, when the user (101) approaches the vehicle (111) before entering the vehicle (111), the camera (103) of the vehicle (111) can capture one or more images of the user (101), and analyze the image(s) to recognize items (e.g., 126) carried by or associated with the user (101). When the user (101) leaves the vehicle (111), the camera (103) of the vehicle (111) can capture one or more further images of the user (101) moving away from the vehicle, and analyze the image(s) to determine whether the previously recognized items (e.g., 126) are with the user (101). If one or more items (e.g., 126) are captured in the images of the user (101) approaching the vehicle (111) but not in the images of the user (101) leaving the vehicle (111), the computer system (131) can generate an alert for the user (101) and/or the driver of the vehicle (111).

In some implementations, the camera (103) is configured to monitor at least a portion of the interior of the vehicle (111), such as seats (108, 109) of the vehicle (111), a cargo space of the vehicle (111), etc. The computer system (131) is configured to identify, from the images from the camera (103), items (e.g., 126) that appear in the vehicle (111) after the user (101) enters the vehicle (111), and check the presence of the recognized items in the vehicle (111) after the user (101) exits the vehicle (111).

For example, if the presence of an item (126) inside the vehicle (111) is detected after a door (e.g., 105 or 107) is opened to allow the user (101) to enter the vehicle (111), the item (126) is associated with the user (101). After the user (101) leaves the vehicle (111), closes a door (e.g., 105 or 107), and/or locks the vehicle, the computer system (131) determines whether the item (126) associated with the user (101) is still present in the vehicle (111). If so, the computer system (131) can generate an alert to the user (101), a driver of the vehicle (111), and/or an owner of the vehicle (111).

The computer system (131) can be customized to generate different alerts based on the type of the item (126) being left/forgotten in the vehicle (111).

For example, when the computer system (131) recognizes, using the artificial neural network (ANN) (125) and from an image from the camera (103), that the item (126) forgotten in the vehicle (111) is a kid or a pet, the computer system (131) can instruct the vehicle (111) to sound (104) a horn and/or flash the lights (e.g., 102) of the vehicle (111) until the user (101) and/or a driver of the vehicle (111) performs an operation to cancel the alarm, such as opening a door (105) next to the item (126) and closing the door (105), pressing a predetermine button on a wireless key to the vehicle (111), or selecting a graphical user interface element presented on a smart phone of the user (101), or any combination thereof. However, when a bag is left in the vehicle (111), the computer system (131) can sound the horn once or twice as a reminder, without requiring the user (101) to perform an explicit operation to cancel or stop the alarms. For example, the intensity of the alert generated using the horn of the vehicle (111) can be customized based on the likelihood that the user (101) would like to take the item (126) with the user (101).

For example, a mobile application can be configured in the smart phone (e.g., 106) of the user (101) to present the alert; and a button can be configured in the mobile application to indicate the intent of the user (101) to leave the item (126) for a period of time. Based on the explicitly identified intent of the user (101) provided in the mobile application, the computer system (131) can skip the alarm upon the user (101) leaving the vehicle (111), and/or suppressing the alarm for the period of time. Upon the expiration of the period of time, the computer system (131) can check the presence of the item (126) in the vehicle (111) and generate an alarm if the item (126) still remains in the vehicle (111) without the presence of the user (101) and/or without a driver in the vehicle (111).

In some implementations, the computer system (131) can customize the alerts based on the identity of the user (101). For example, when the vehicle (111) recognizes the user (101) as an owner or driver of the vehicle (111), the computer system (131) can communicate with the user (101)

via a pre-registered mobile device (106) of the user (101), such a smart phone or a personal media player.

For example, when an item (126) is determined to be left behind in the vehicle (111) by the user (101), the computer system (131) transmits a message that identifies the item (126) and/or that includes a photo image of the item (126) in the vehicle (111). Subsequently, when the item (126) is removed from the vehicle by another person, the vehicle (111) can capture an image of the person removing the item (126) and indicate the removal of the item (126) to the user (101).

When a kid or pet is left behind in the vehicle (111), the computer system (131) can provide a voice communication connection with the mobile phone or mobile application such that the user (101) can communicate with the kid or pet in voice before the user (101) returns to the vehicle (111) to retrieve the kid or pet.

In some implementations, the user (101) can be registered with the vehicle for a limited time period for the ride in the vehicle (111) and/or a time period after leaving the vehicle (111). For example, the user (101) can use a mobile application to order a ride sharing service, or a taxi ride. When the vehicle (111) detects that the user (101) has left the item (126) in the vehicle (111), the vehicle (111) can transmit information about the item (126) to the user within a predetermined period of time.

The computer system (131) can determine an identity of the user (101) based on a key used by the user (101) to operate the vehicle (111), or based on an image from the camera (103). For example, the camera (103) can capture a facial image of the user (101) when the user (101) is sufficiently close to the vehicle (111) and use a facial recognition technique to identify the user (101). In other implementations, the computer system (131) can recognize the user (101) based on an identification device carried on the user (101), such as a radio frequency identification (RFID) device, a near field communication (NFC) device that has an identification code of the user (101), etc.

When the computer system (131) can recognize the identity of the user (101), the computer system (131) can customize the alerts based on the preferences of the user (101). For example, the user may select one ringtone to be played when an item of one category is left behind in the vehicle (111) and another ringtone to be played when an item of another category is left behind in the vehicle (111). For example, the user (101) may choose to suppress alerts when an item of a predetermined category is left in the vehicle (111). However, the mobile application tracks the items that are currently left behind in the vehicle (111) such that the user (101) can view a list of items that are currently in the vehicle (111) and/or view their current states as in the vehicle (111).

When the identity of the user (101) is unknown, the vehicle (111) can be configured to alert the user (101) via the vehicle (111) and/or via the driver or owner of the vehicle (111). For example, the computer system (131) can instruct the vehicle (111) to sound (104) an alert using a horn of the vehicle (111), or via a voice prompt played in an infotainment system of the vehicle (111). The alert can be played while the user (101) is in the vicinity of the vehicle such that the driver and/or the user (101) can hear the alert as a reminder to retrieve the item (126). Alternatively, or in combination, the alert is transmitted to a mobile application running in a registered device of the driver or owner of the vehicle (111) so that the driver or owner of the vehicle (111) may contact the user (101) about the item (126).

The alert transmitted to the mobile device of the driver or owner of the vehicle (111) may identify the user (101) using an image of the user (101). The image of the user can be captured when the user (101) is approaching the vehicle (111) for the ride, or while the user (101) is in the vehicle (111) during the ride. For example, when passengers of a vehicle operated by a rider sharing service or a taxi, the vehicle (111) can associate an image of a passenger (101) and an image of the item (126) left by the passenger (101) in the vehicle (111).

Optionally, the artificial neural network (125) is further trained to recognize the patterns of the responses of the user (101) to the alerts; and the computer system (131) is configured to customize the alerts based on the patterns of the past responses of the user (101). For example, when the user (101) routinely leave an item (126) in the vehicle (111) for a time and/or location pattern, the computer system (131) can suppress the alert when the item (126) is left in the vehicle (111) in a time and/or location instance that agrees with the pattern.

For example, based on the responses from the user (101) for alerts generated for items of different categories, for different time instances at different locations, the ANN (125) can be trained to predict whether the user (101) wants an alert for the current instant of leaving the item (126) in the vehicle (111).

Figure 2:
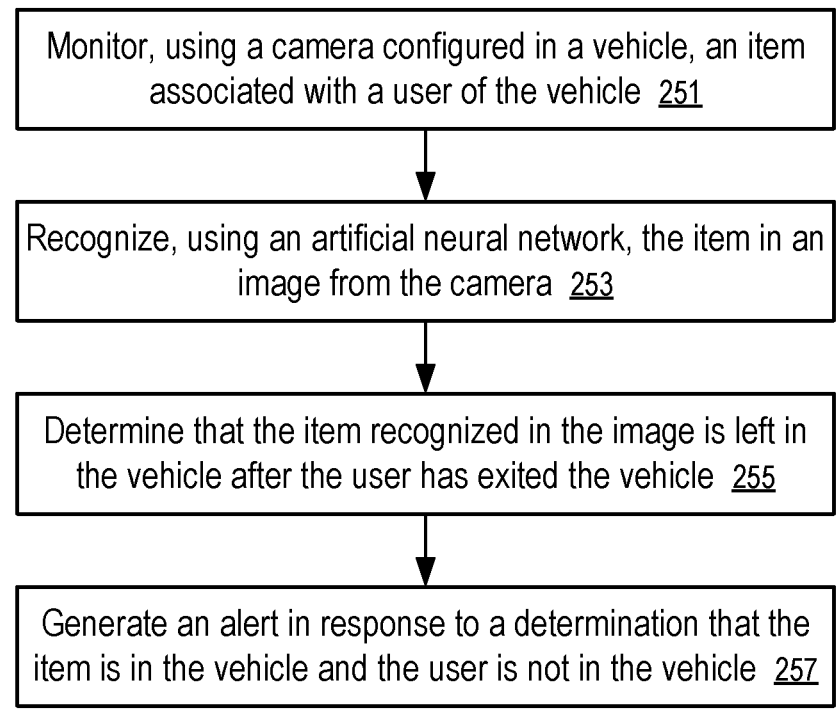
FIG. 2 shows a method to generate alerts about an item left in a vehicle according to one embodiment.

FIG. 2 shows a method to generate alerts about an item (126) left in a vehicle (111) according to one embodiment. For example, the method of FIG. 2 can be implemented in a vehicle (111) of FIG. 1.

At block 251, a camera (103) configured in a vehicle (111) is used to monitor an item (126) associated with a user (101) of the vehicle (111).

For example, the monitoring of the item (126) can be implemented using a camera (103) configured to capture images of surroundings of the vehicle (111), such as a camera of an Advanced Driver Assistance System (ADAS) of the vehicle (111). When the camera (103) captures an image of the user (101) approaching the vehicle (111) with the item (126) before the user (101) enters the vehicle (111), the item (126) can be associated with the vehicle (111). For example, the camera (103) can be configured to capture images periodically when the vehicle (111) is stopped and/or in a parked status, or when a door of the door (105 or 107) is unlocked and/or opened, or in response to a proximity sensor detecting a person near a door (105 or 107) of the vehicle (111), or when a computer system of the vehicle (111) determines that a person is likely to enter the vehicle (111) based on a pattern of activities of the vehicle (111) in the past and/or other information, such as a request for a ride received in a ride sharing application.

Alternatively, or in combination, the monitoring of the item (126) can be implemented using a camera (103) configured to image the interior of the vehicle (111). When an item (126) that is absent from the vehicle (111) is detected to be present in the vehicle (111) after the user (101) enters the vehicle (111), and/or detected to be in close proximity with the user (101) in vehicle (111) of a period of time, the item (126) can be associated with the user (101).

In general, the user (101) can be a passenger, a driver, and/or an owner of the vehicle (111).

At block 253, a computer system (131) uses an artificial neural network (125) to recognize the item (126) in an image from the camera (103). For example, techniques of computer vision can use the artificial neural network (125) to classify the item (126) as captured in the image into one of a plurality of predetermined classifications, categories, names of items, or whether the item (126) is likely to be forgotten by the user (101).

At block 255, the computer system (131) determines that the item (126), recognized in the image, is left in the vehicle (111) after the user (101) has exited the vehicle (111). For example, the determination can be made in response to detecting that the user (101) has exited the vehicle (111), or is about to exit the vehicle (111).

At block 257, the computer system (131) generates an alert in response to a determination that the item (126) is in the vehicle (111) and the user (101) is not in the vehicle (111). For example, if the computer system (131) determines that the item (126) is likely to be left in the vehicle (111) by mistake, the alert is generated; otherwise, the alert is not generated. For example, the computer system (131) can determine whether the item (126) is likely to be left in the vehicle (11) by mistake based on a classification/category of the item (126) determined by the artificial neural network (125), or based on a likelihood of the item (126) being forgotten by the user (101) as estimated by the artificial neural network (125), and/or based on activity history of the user (101) and/or similar users.

For example, based on the images from the camera (103), the computer system (131) detects that the user (101) exits the vehicle (111); and in response to closing a door (e.g., 107 and/or 105) of the vehicle (111) after the user (101) exits the vehicle (111), the computer system (131) provides, or instructs the vehicle (111) to provide, the alert.

For example, the camera (103) can be used by the computer system (131) to monitor the movements of the user (101) outside of the vehicle (111). In response to a determination that, based on the monitoring of the movements of the user (101), the user (101) is traveling away from the vehicle (111) (e.g., when the distance between the user and the vehicle (111) is increased to above a threshold), the computer system (131) provides, or instructs the vehicle (111) to provide, the alert.

In some implementations, the alert is provided in response to a command or signal to lock the vehicle (111) after the user exits the vehicle (111). For example, the user can generate the command or signal to lock the vehicle (111) using a key to the vehicle (111).

In some implementations, the artificial neural network (ANN) (125) is trained via machine learning to recognize the item by classifying, the item as captured in an image into a category in a plurality of predefined categories. For example, the category can be child, pet, bag, briefcase, purse, wallet, etc.

An example of the alert is noises generated using a horn of the vehicle (111), flashing lights of the vehicle (111), one or more voice prompts from an infotainment system of the vehicle (111), a communication to a mobile application running in a mobile device (106) of the user (101), or a ringtone played via the mobile application. In general, any combination of the different types of alerts can be used and/or customized for the user (101) based on an identity of the user (101). For example, the identity of the user (101) can be determined based on facial recognition from an image of the user (101) captured by the camera. For example, the identity of the user (101) can be determined based on an identification code in a device carried by the user (101), such as a radio frequency identification (RFID) tag, a near field communication (NFC) device, a mobile phone (e.g., 106), etc. After the identity of the user is identified, the computer system (131) can transmit the alert to a mobile device (106) of the user (101) using contact information associated with the user (101), such as a phone number, an email number, an account number, etc.

In some embodiment, when the item (126) is in a predefined category (e.g., child or pet), the computer system (131) can continue the alert until the vehicle (111) and/or the computer system (131) receives an indication of a decision of the user (101) to leave the item (126) in the vehicle (111).

For example, the indication can be made by the user (101) opening the door (105) next to the item (126) and closing the door (105). For example, the indication can be made by the user (101) pressing a button in a mobile application running in the mobile device (106), or using a voice command.

Optionally, the user may identify a time period for suppressing the alert (e.g., using the mobile application or a voice command); and subsequently, the computer system (131) can resume the alert after the time period expires and in response to a determination that, after the time period, the item (126) still remains in the vehicle (111) and the user (101) is not in the vehicle (111).

Optionally, the computer system (131) can use the artificial neural network (125) to determine the likelihood of the user (101) intending to leave the item (126) in the vehicle (111), based on past responses from the user to alerts generated to indicate items being left by the user (101) in the vehicle (111). When the item (126) is detected to be left behind by the user (101) in the vehicle (111), the artificial neural network (125) is used to calculate a prediction of whether the user intends to leave the item in the vehicle (111). The prediction can be dependent on the category of the item, the current date and time, and/or the current location of the vehicle (111). When the likelihood of the user having the intention to leave the item in the vehicle (111) is above a threshold, the alert can be suppressed, or downgraded in intensity.

Optionally, when a kid or a pet is left behind by the user (101) in the vehicle (111), the computer system (131) can establish a communication channel between the mobile device (106) of the user (101) and the vehicle (111) to facilitate voice communications between the user (101) away from the vehicle (111) and the kid or pet in the vehicle (111).

Optionally, the alert can include an image of the item (126), captured by the camera (103) in the vehicle (111) and transmitted to the mobile device (106) of the user (101) after the user (101) is away from the vehicle (111).

Figure 3:
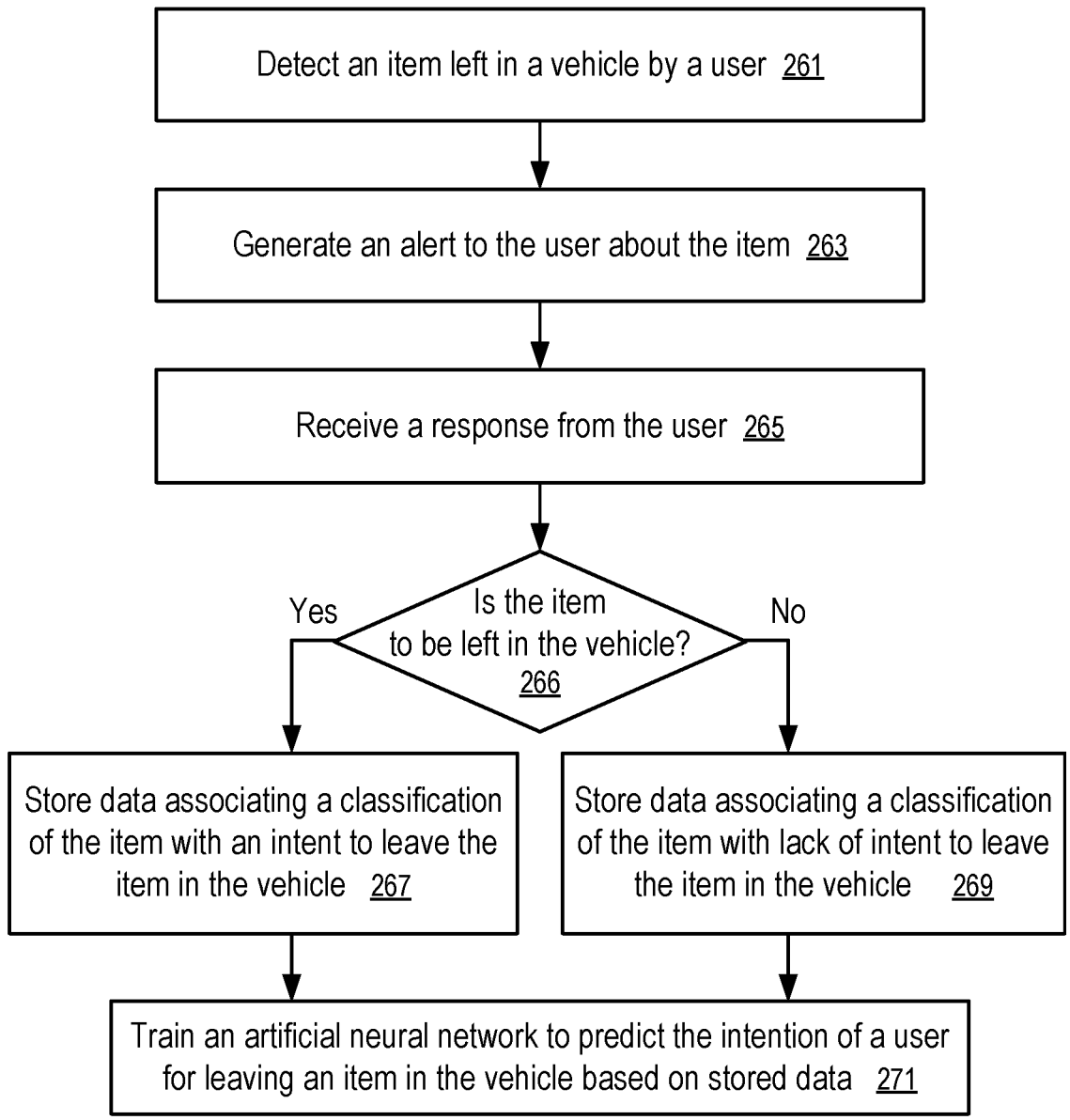
FIG. 3 shows a method to train an artificial neural network of a vehicle to predict an intent of a user for an item left in the vehicle according to one embodiment.

FIG. 3 shows a method to train an artificial neural network (125) of a vehicle (111) to predict an intent of a user (101) for an item left in the vehicle (111) according to one embodiment.

At block 261, a vehicle (111) detects an item (126) left in the vehicle (111) by a user (101).

At block 263, the vehicle (111) generates an alert to the user (101) about the item (126).

At block 265, the vehicle (111) receives a response from the user (101) regarding the alert and/or the item (126).

At block 266, it is determined whether the item is left in the vehicle in view of the alert. If so, at block 267, the vehicle (111) stores data associating a classification of the item (126) with an intent to leave the item (126) in the vehicle (111); otherwise, at block 269, the vehicle (111) stores data associating a classification of the item (126) with the lack of intent to leave the item (126) in the vehicle (111).

Optionally, the intent or the lack of the intent to leave the item (126) can be further stored in association with parameters that can be relevant to the decision of the user (101) to leave the item (126) in the vehicle (111), such as the date and time of leaving the item (126) in the vehicle (111), the location of the vehicle (111), the presence of other objects or persons in the vehicle (111), etc.

At block 271, the stored training data can be used to train an artificial neural network (125) to predict the intention of a user for leaving an item in the vehicle (111). The prediction is made by the artificial neural network (125) based on the classification of the item and/or the other parameters relevant to the decisions of the user (101) to leave items (126) in the vehicle (111), such as the date and time, the location of the vehicle (111), the presence of other objects or persons in the vehicle (111), etc.

The training can be performed in the vehicle (111). Alternatively, the training data can be downloaded at a maintenance facility and/or uploaded to a server for the training of an artificial neural network. The trained artificial neural network (125) can be installed in the vehicle (111) through an update to improve the capability of the vehicle (111) in predicting the intent of the user (101).

The techniques of FIGS. 1-3 can be implemented in a system illustrated FIG. 4 and/or using a data storage device discussed below.

For example, a data storage device can include: one or more memory components configured to store data; an interface configured to receive, from a camera (103) configured in a vehicle (111), images to monitor an item (126) associated with a user (101) of the vehicle (111); an inference engine configured to recognize, using an artificial neural network (125), the item (126) in the images from the camera (103); and a controller configured to determine that the item recognized in the images is left in the vehicle (111) after the user (101) has exited the vehicle (111) and cause the vehicle (111) to generate an alert in response to a determination that the item (126) is in the vehicle (111) but the user is not in the vehicle (111).

For example, the inference engine can include a neural network accelerator configured to perform matrix arithmetic computations more efficiently than the controller.

In some embodiment, the techniques of detecting an item left in the vehicle (111) can be implemented in a computer system (131) of the vehicle (111).

Figure 4:
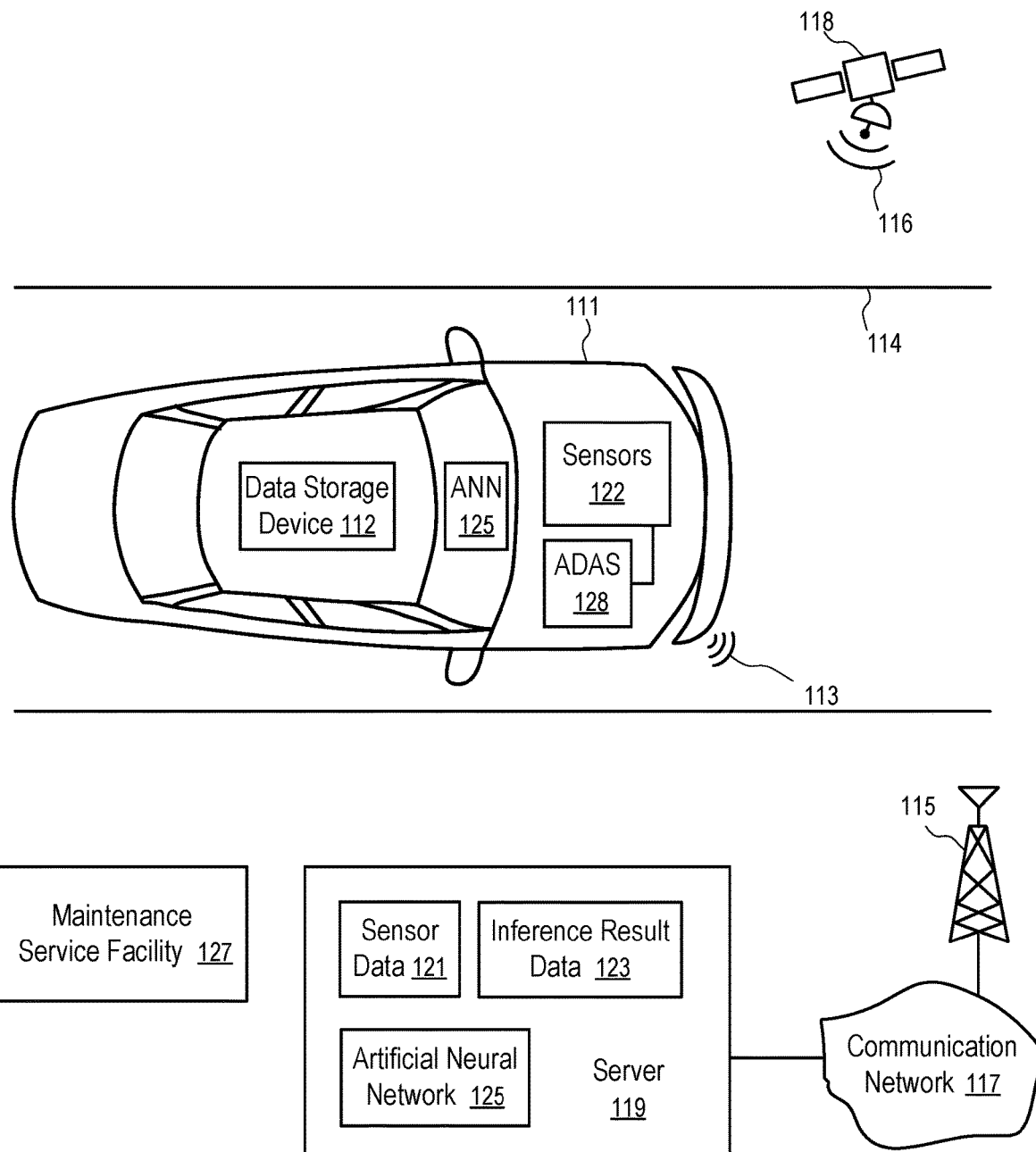
FIG. 4 shows a system having a vehicle configured to collect and process sensor data according to some embodiments.

FIG. 4 shows a system having a vehicle (111) configured to collect and process sensor data according to some embodiments.

The vehicle (111) in FIG. 4 has a data storage device (112), sensors (122), an ANN (125), and an ADAS (128) configured to process sensor data, including inputs from the sensors (122), to generate control signals for the vehicle (111).

In general, one or more sensors (e.g., 122) can be configured on the vehicle (111) to generate sensor data input to the ADAS (128) and/or the data storage device (112). The data storage device (112) and/or the ADAS (128) can be configured to use the ANN (125) to generate inference results. The inference results can include a control signal for operating or driving the vehicle (111), a suggestion for a maintenance service of the vehicle (111), etc.

In some implementations, at least a portion of the data generate by the sensors (e.g., 122) is used in both the ADAS (128) for driver assistance and in the ANN (125) for maintenance prediction. Optionally, the output of the ANN (124) can be used in both the data storage device (112) and in the ADAS (128). The ANN (125) can be part of the ADAS (128).

The sensors (122) can be configured in a digital camera, lidar, radar, ultrasound sonar, etc. Other types of sensors can also be used, such as brake sensors, speed sensors, acceleration sensors, airbag sensors, a GPS (global positioning system) receiver, audio sensors/microphones, vibration sensors, force/stress sensors, deformation sensors, motion sensors, temperature sensors, etc. Some of the sensors (122) can be configured primarily to monitor the environment of the vehicle (111); and other sensors (122) can be configured primarily to monitor the operating condition of one or more component of the vehicle (111), such as an internal combustion engine, an exhaust system, an electric motor, a brake, a tire, a battery, etc.

The ANN (125) of the vehicle (111) is configured to process the sensor input data from the sensors (122) to control the vehicle (111) and/or the data storage device (112).

In general, the outputs of the sensor(s) (122) as a function of time are provided as a sensor data stream to the ADAS (128) and/or the ANN (125) to provide driver assistance (e.g., autonomous driving) and maintenance prediction.

At least a portion of the sensor data stream can be provided to the data storage device (112) for storing and/or for processing. For example, a portion of the ANN (125) can be implemented in the data storage device (112). An inference engine of the data storage device (112) can process the sensor data stream to generate inference results for further processing by the ADAS (128). Thus, the input data stream to the data storage device (112) can include at least a portion of the sensor data stream from the sensors (122); and the output data stream from the data storage device (112) can include inference results generated using the ANN (125) in the data storage device (112) for the ADAS (128) of the vehicle (111). The operating condition of the vehicle (111) and thus the workload of the data storage device (112) can be determined from the patterns in the input/output data streams.

The ANN (125) of the vehicle (111) and/or in the data storage device (112) can include an SNN configured to classify time-based variations of sensor data and/or detect deviation from known patterns of sensor data of the vehicle (111). When the ANN (125) detects the deviation from known patterns, the sensor data corresponding to the deviation can be stored in the data storage device (112) for further analysis and/or for further training of the ANN (125).

The data storage device (112) of the vehicle (111) can be configured to record sensor data for a period of time. The recorded sensor data can be used in the ANN (125) for predictive maintenance and/or used to further train the ANN (125). The maintenance service facility (e.g., 127) can download the sensor data (121) from the data storage device (112) and provide the sensor data (121) and the corresponding inference result data (123) to the server (119) to facilitate the training of the ANN (125).

Optionally, or in combination, the data storage device (112) is configured with a machine learning module to customize and/or train the ANN (125) installed in the vehicle (111) and/or in the data storage device (112).

The vehicle (111) can have a wireless communication device to communicate with a remote server (119) via wireless signals (113) and a communication network (117). The remote server (119) is typically configured at a location away from a road (114) on which the vehicle (111) is in service. For example, the vehicle (111) may provide some sensor data (121) to the server (119) and receive update of the ANN (125) from the server (119).

The communication network (117) can be a cellular phone network having one or more base stations (e.g., 115) to receive the wireless signals (e.g., 113). Alternatively, or in combination, the communication network (117) can include the Internet, where the wireless local area network signals (e.g., 113) transmitted by the vehicle (111) is received in an access point (e.g., 115) for further communication to the server (119). In some implementations, the vehicle (111) uses a communication link (116) to a satellite (118) or a communication balloon to communicate with the server (119).

The server (119) can also communicate with one or more maintenance service facilities (e.g., 127) to receive the sensor data (121) and/or the desired inference result data (123) of vehicles (e.g., 111).

For example, the desired inference result data (123) can be generated by a human operator inspecting the sensor data (121) (e.g., images from the sensors (122)) and/or relevant conditions of the vehicle (111). For example, the desired inference result data (123) can include inspection records and/or service records of components of the vehicles (e.g., 111). For example, the inspection records and/or service records can indicate the degree of wear and tear of components inspected during their services at the maintenance service facilities (e.g., 127), the identification of failed or malfunctioning components, etc. The sensor data (121) of the vehicles (e.g., 111) obtained in a time period relevant to the desired inference result data (123) can be used to train an ANN (125) at the server (119) to improve inference capability of the ANN (125).

The updated ANN (125) can be installed in the vehicle (111) at the maintenance service facility (127). Alternatively, the update ANN (125) can be transmitted to the vehicle (111) to update the vehicle (111) over the air.

Figure 5:
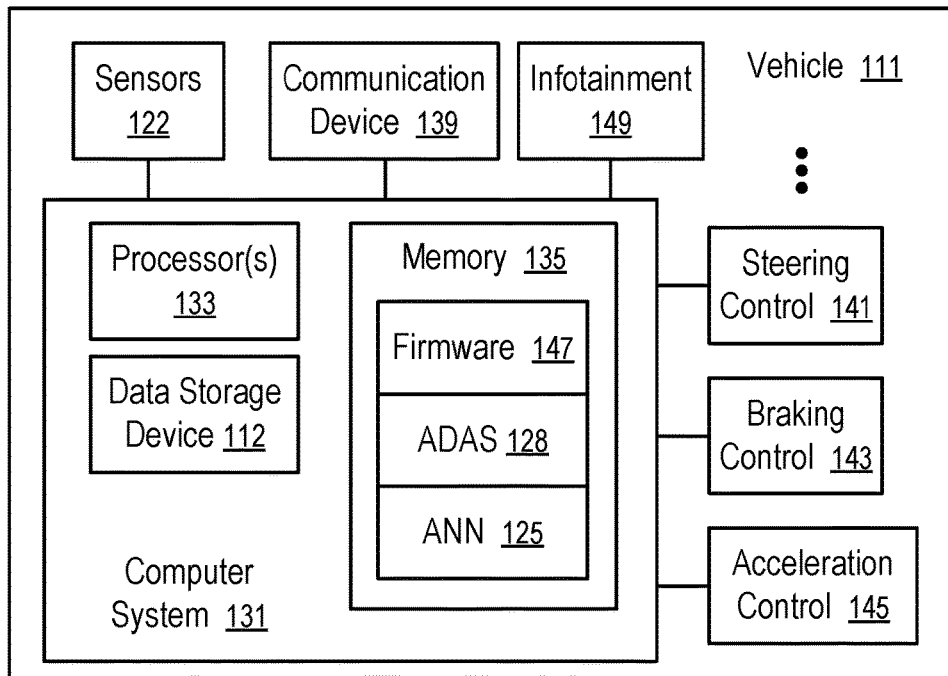
FIG. 5 shows an autonomous vehicle according to one embodiment.

FIG. 5 shows an autonomous vehicle (111) according to one embodiment. For example, the vehicle (111) in the system of FIG. 4 can be implemented using the autonomous vehicle (111) of FIG. 5.

In general, the vehicle (111) can include an infotainment system (149), a communication device (139), one or more sensors (122), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 4 has a similar configuration and/or similar components.

The vehicle (111) of FIG. 5 is configured with an Advanced Driver Assistance System (ADAS) (128). The ADAS (128) of the vehicle (111) can have an Artificial Neural Network (ANN) (125) for object detection, recognition, identification, and/or classification, based on images generated in the sensors (122). A portion of the ANN (125) can be implemented in the data storage device (112).

The computer system (131) of the vehicle (111) can include one or more processors (133), a data storage device (112), and memory (135) storing firmware (or software) (147), including the computer instructions and data models for ADAS (128).

Sensors (122) of the vehicle (111) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors (122) of the vehicle (111) can include audio sensors (e.g., microphone) configured to monitor noises from various components and locations in the vehicle (111), a vibration sensor, a pressure sensor, a force sensor, a stress sensor, and/or a deformation sensor configured to measure loads on a component of the vehicle (111), accelerometers and/or gyroscope sensors measuring the motions of some components of the vehicle (111), etc. Such sensors can be used to monitor the operating status and/or health of the components for predictive maintenance.

The sensors (122) can provide a stream of real time sensor data to the computer system (131). The sensor data generated by sensors (122) of the vehicle (111) can include an image that captures an object using a camera that images using lights visible to human eyes, or a camera that images using infrared lights, or a sonar, radar, or LIDAR system. Preferably, the image is processed by the inference engine of the data storage device (112) to generate inference results as the output data stream of the data storage device (112) and thus reduce the computation workload of the main computer system (131).

For example, a camera can be used to obtain roadway information for the travel of the vehicle (111), which can be processed by the ANN (125) to generate control signals for the vehicle (111). For example, a camera can be used to monitor the operation state/health of a component of the vehicle (111), which can be processed by the ANN (125) to predict or schedule a maintenance service.

The infotainment system (149) of the vehicle (111) can be used to present data and/or inference results from the sensors (122). For example, compressed images with reduced resolution and refreshing frequency can be generated in the sensors (122) and transmitted to the infotainment system (149) for presentation to an occupant of the vehicle (111). Optionally, the communication device (139) can establish a connection to a mobile device of an occupant of the vehicle (111) to make the presentation.

When the vehicle (111) is configured with an ADAS (128), the outputs of the ADAS (128) can be used to control (e.g., 141, 143, 145) the acceleration of the vehicle (111), the speed of the vehicle (111), and/or the direction of the vehicle (111), during autonomous driving.

Figure 6:
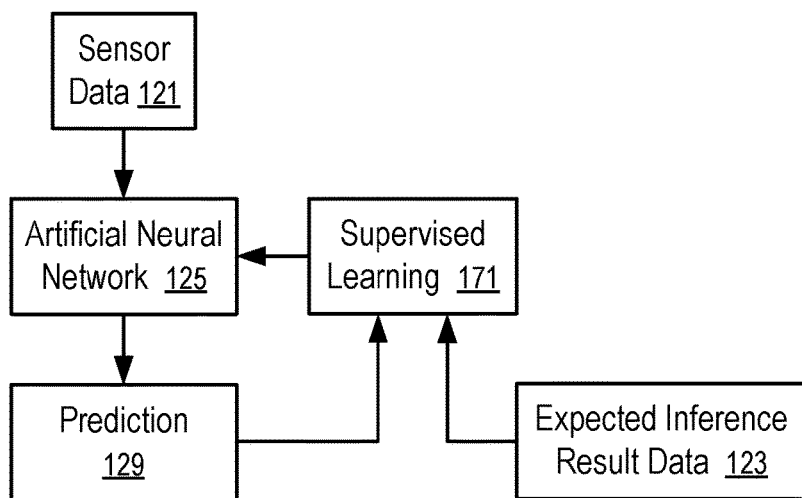
FIGS. 6-8 illustrate training of artificial neural networks for prediction according to some embodiments.
Figure 7:
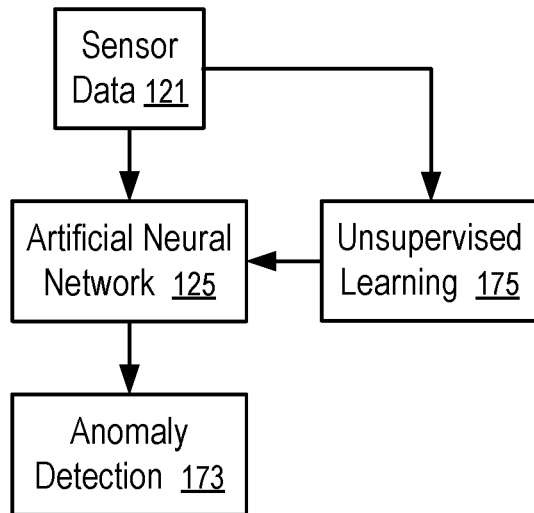
Figure 8:
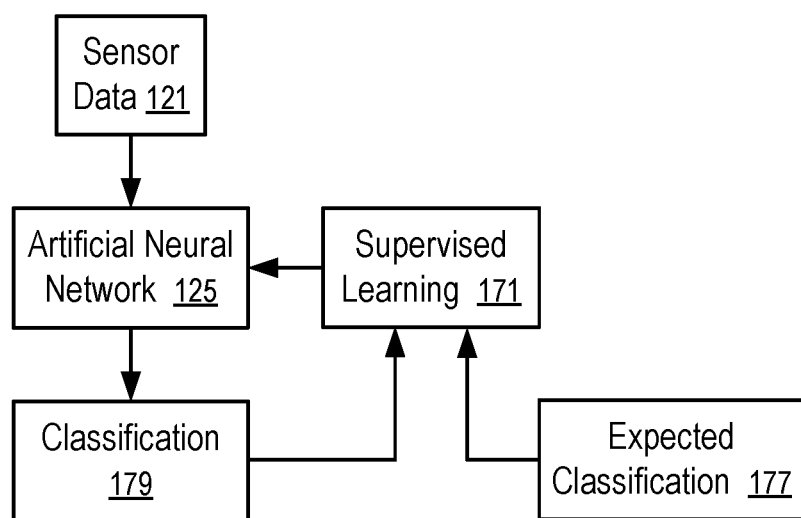

FIGS. 6-8 illustrate training of artificial neural networks (125) for prediction according to some embodiments.

In FIG. 6, a module (171) of supervised machine learning is used to train an artificial neural network (125) to minimize the differences between the prediction (129) generated from the sensor data (121) and the desired inference result data (123).

For example, the sensor data (121) can include an image showing an object; and the desired/expected inference result data (123) can identify an image region occupied by the object, a feature of the object, a classification of the object, an identity of the object, etc.

For example, the sensor data (121) can include an image surrounding of the vehicle (111); and the desired/expected inference result data (123) can include preferred control inputs for the steering control (141), the braking control (143), and the acceleration control (145).

The desired/expected inference result data (123) can be generated by a human operator. For example, the sensor data (121) can be used to construct a virtual reality demonstration of a situation encountered by the vehicle (111), including images from the sensors (122) showing an environment of the vehicle (111); and the desired/expected inference result data (123) can include responses generated by a human operator responsive to the virtual reality demonstration of the situation.

The supervised machine learning module (171) can adjust the artificial neural network (125) to reduce/minimize the difference between the prediction (129) generated based on the sensor data (121) and the desired/expected inference result data (123) generated by a human operator.

The supervised learning (171) of FIG. 6 can be applied in the server (119) based on the sensor data of a population of vehicles and corresponding desired/expected inference result data (123) to generate a generic ANN for the population of the vehicles.

The supervised learning (171) of FIG. 6 can be applied in the vehicle (111) based on the sensor data of the vehicle and inference result data (123) to generate a customized/personalized ANN (125). For example, a generic ANN (125) can be initially used in the vehicle (111); and the sensor data of the vehicle (111) and desired/expected inference result data (123) specific to the vehicle (111) can be used to further train the ANN (125) of the vehicle for customization/personalization of the ANN (125) in the vehicle (111).

In FIG. 7, a module (175) of unsupervised machine learning is used to train or refine an artificial neural network (125) to facilitate anomaly detection (173). The unsupervised machine learning module (175) is configured to adjust the ANN (e.g., SNN) to generate the normal classification, clustering, or recognized patterns in the sensor data (121) such that a degree of deviation from the normal classification, clustering, or recognized patterns in the sensor data (121) can be used to signal the detection (173) of anomaly.

For example, anomaly detection (173) can be used to preserve the sensor data (121) associated with anomaly for further analysis. In response to anomaly detection (173) in the vehicle (111), the computer system (131) can issue read command to the sensors (122) to retrieve image data associated with the anomaly from the sensors (122) and store the retrieved image data in the data storage device (112). The image data associated with the anomaly can be temporarily preserved in the memory device of the sensors (122) and loaded to the data storage device (112) over a period of time using available communication bandwidth between the sensors (122) and the data storage device (112) without impacting the normal operations of the ADAS (128).

When the vehicle (111) is in the maintenance service facility (127), the image data (and other sensor data) associated with the anomaly can be retrieved from the data storage device (112) to generate desired/expected inference result data (123) for further training of the ANN (125) using a supervised learning (171) of FIG. 6.

Optionally, a supervised machine learning (171) can be used to train the ANN (125), as illustrated in FIG. 8. The supervised learning (171) can be used to minimize the classification differences between the predictions (179) made using the ANN (125) according to the sensor data (121) and the expected classification (177).

For example, in absence of an accident, a near accident event, or a user input indicating an abnormal condition, a classification of "normal" can be assumed. An accident, a near accident event, or a user input can be used to identify an expected classification of "abnormal" for the sensor data leading to the accident, event, or user input. The supervised machine learning (171) can be used to train the artificial neural network (125) to make the classification (179) with reduced/minimized differences from the expected classification (177).

Optionally, the inference engine of the data storage device (112) can be configured to accelerate the computations of a portion of the artificial neural network (ANN) (125) implemented in the data storage device (112).

For example, the inference engine can include a neural network accelerator (159) (e.g., illustrated in FIG. 9) specialized to perform at least part of the computations involving the artificial neural network (ANN) (125), such as dot-product of vectors and tensors, multiply and accumulation operations, etc.

Figure 9:
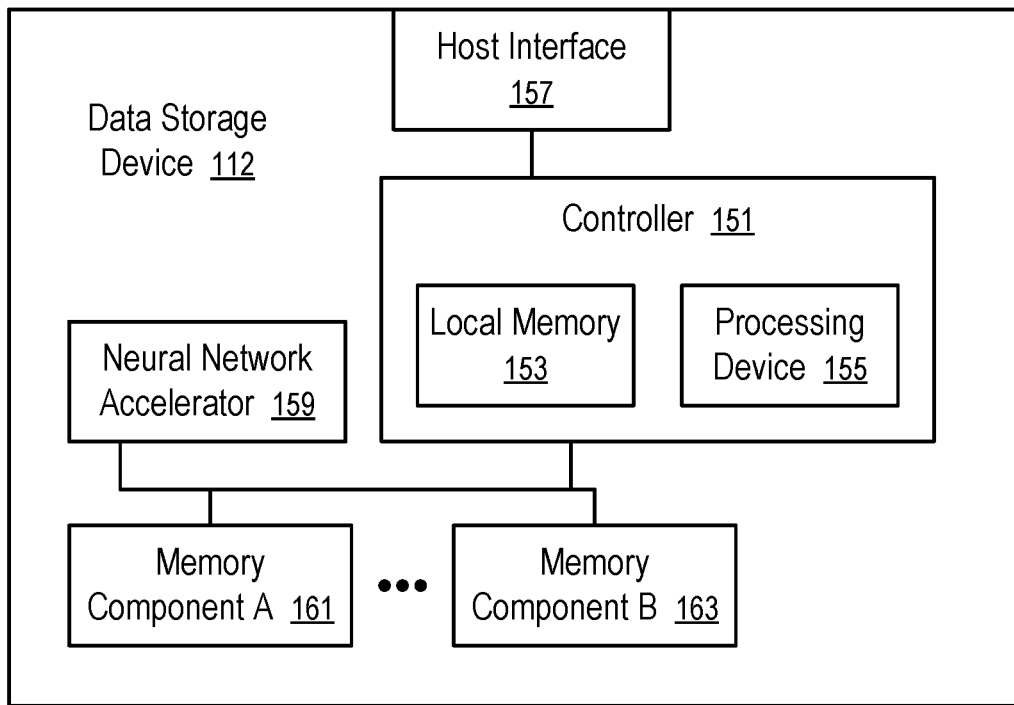
FIG. 9 shows a data storage device with a neural network accelerator according to one embodiment.

FIG. 9 shows a data storage device (112) with a neural network accelerator (159) according to one embodiment. For example, the data storage device (112) of FIG. 9 can be used in the vehicle (111) illustrated in FIG. 4 or 5.

In FIG. 9, the data storage device (112) has a host interface (157) configured to communicate with a host processor (e.g., 133 in FIG. 5). For example, the communication between the host processor (e.g., 133) and the host interface (157) can be, at least in part, in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

For example, the host computer system (131) can communicate with the host interface (157) to retrieve inference results generated by the data storage device (112) from the input data stream that contains sensor data generated by the sensors (122) of the vehicle (111).

For example, the host interface (157) can be used to receive, from the sensors (122), sensor data (121) of the vehicle (111); and the sensor data (121) can be optionally stored in the data storage device (112) for an analysis of a subsequent accident or near accident event.

In FIG. 9, each of the memory components (161 to 163) can be a memory integrated circuit configured to store data.

The neural network accelerator (159) and the controller (151) can be implemented via logic circuits formed on one or more integrated circuit dies that are stacked on the integrated circuit dies of the memory components (161 to 163). Through-silicon vias between the integrated circuit die(s) of the neural network accelerator (159) and the controller (151) and the integrated circuit dies of the memory components (161 to 163) can be used to provide high communication bandwidth for processing the data stored in the memory components (161 to 163) to generate inference results. The inference results can be stored in the local memory (153) of the controller (151) and/or some of the memory components (161 to 163) for retrieval by the host system, such as the computer system (131) of the vehicle (111). For example, different memory components (161 to 163), or different sections of a memory component (e.g., 161 or 163), can use through-silicon vias to facilitate parallel access for different portions of the neural network accelerator (159), and the controller (151).

In general, some memory integrated circuits are volatile and require power to maintain the stored data; and some memory integrated circuits are non-volatile and can retain the stored data even when not powered. The memory components (161 to 163) can include volatile memory and/or non-volatile memory. The memory components (161 to 163) can implement different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer is located above the memory element columns, and wires of the other lay is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The data storage device (112) can have a controller (151) that includes volatile local memory (153) and at least one processing device (155).

The local memory of the controller (151) can be an embedded memory configured to store instructions for performing various processes, operations, logic flows, and routines that control operation of the processing device (155), including handling communications between the data storage device (112) and the processor(s) (e.g., 133) of the vehicle (111), and other functions described herein. Optionally, the local memory (153) of the controller (151) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 9, the data storage device (112) includes a neural network accelerator (159) coupled to the controller (151) and/or the memory components (161 to 163).

For example, the neural network accelerator (159) can be configured to perform matrix arithmetic computations more efficiently than the processing device (155) of the controller (151). The computations involving ANN (125) have matrix multiplication and accumulation operations, which can be computational intensive for a generic processor (e.g., 133, 155). Using the neural network accelerator (159) to perform the matrix arithmetic computations can reduce the data to be transmitted to the processor(s) (133) of the vehicle (111) and reduce the computation workload for the processor(s) (133, 155).

When the ANN (125) includes a Spiking Neural Network (SNN), the simulation of the differential equation(s) for controlling the activation level of SNN neurons can be computationally intensive for a generic processor (e.g., 133, 155). Optionally, the neural network accelerator (159) can use special hardware to simulate the differential equation(s) and thus improve the computational efficiency in implementing the SNN.

In some implementations, the neural network accelerator (159) is an integrated circuit device separate from the controller (151) and/or the memory components (161 to 163). Alternatively, or in combination, a neural network accelerator (159) is integrated with the controller (151) in an integrated circuit die. Alternatively, or in combination, a portion of the neural network accelerator (159) can be integrated on the integrated circuit die(s) of at least one of the memory components (161 to 163), as illustrated in FIG. 10.

Figure 10:
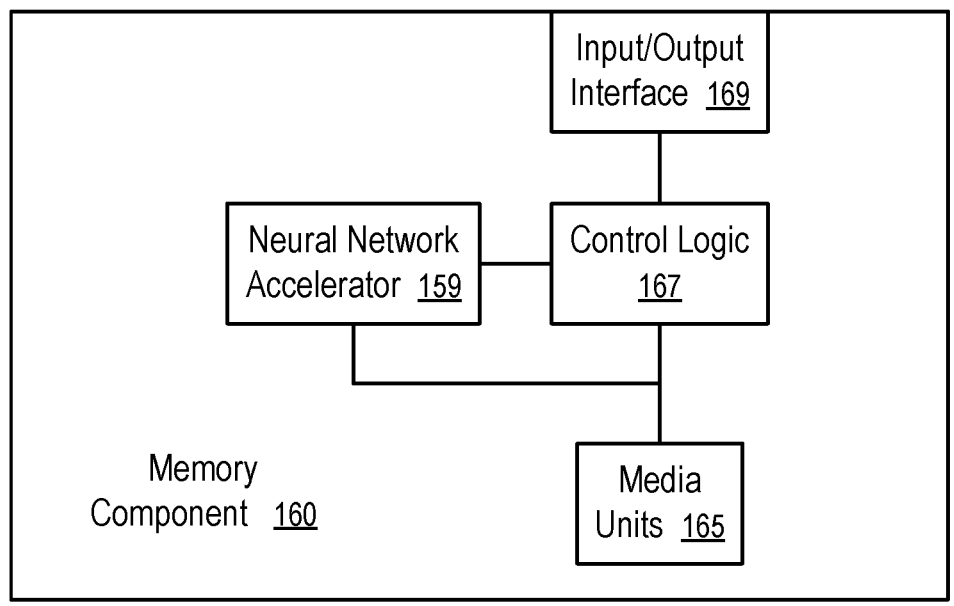
FIG. 10 shows a memory component to accelerate neural network computations according to one embodiment.

FIG. 10 shows a memory component (160) to accelerate neural network computations according to one embodiment. For example, each or some of the memory components (161 to 163) in FIG. 9 can be implemented using a memory component (160) of FIG. 10.

In FIG. 10, the memory component (160) can be formed on an integrated circuit die. An input/output (I/O) interface (169) of the memory component (160) is configured to process input/output signals for the memory component (160). For example, the input/output signals can include address signals to specify locations in the media units (165) and data signals representing data to be written in the media units (165) at the locations specified via the address signals, or data retrieved from the locations in the media units (165).

In FIG. 10, a neural network accelerator (159) is coupled with the control logic (167) and/or the media units (165) to perform computations that are used in the evaluation of the output of a portion of an ANN (125) and/or in the training of the ANN (125).

For example, the input/output interface (169) can receive addresses that identify matrices that are stored in the media units and that are to be operated upon via the neural network accelerator (159). The memory component (160) can provide the computation results of the neural network accelerator (159) as the output data responsive to the addresses, store the output data in a buffer for further operations, store the output data into a location in the media units (165) specified via the address signals. Thus, the computations performed by the neural network accelerator (159) can be within the memory component (160), which is close to the media units (165) in which the matrix data is stored.

For example, the state data of SNN neurons can be stored in the media units (165) according to a predetermined pattern. The neural network accelerator (159) can automatically update the states of the SNN neurons according to the differential equation(s) for controlling the activation level of SNN neurons over time. Optionally, the neural network accelerator (159) is configured to process spiking of neurons in the neural network. Alternatively, the neural network accelerator (159) of the data storage device (112) and/or the processor(s) (133) can be configured to process the spiking of neurons and/or accumulation of inputs to the SNN.

For example, the sensors (122) generate sensor data (e.g., images) at a predetermined frequency. Each image is stored into the memory components (161 to 163) in a cyclic way where the newest image writes over the oldest image. The memory components (161 to 163) further store a portion of ANN (125) of the vehicle (111) responsible for processing of the images from the sensors (122). The controller (151) processes the images in the memory components (161 to 163) according to the portion of ANN (125) to generate inference results. The inference results are stored in the memory components (161 to 163) and/or in the local memory (153) of the controller (151) for reading by the host system, such as the computer system (131) of the vehicle (111).

For example, the data storage device (112) receives a sensor data stream from at least one sensor (122) configured on the vehicle (111) and generate the inference results based on the sensor data stream according to the portion of ANN (125) stored in the memory components (161 to 163). A neural network accelerator (159) configured within the data storage device (112) performs at least a portion of computations based on an artificial neural network (125) and the sensor data stream.

Optionally, the neural network accelerator (159) can be configured on an integrated circuit die that is separate from a controller (151) and/or separate from the memory components (161 to 163).

Optionally, the neural network accelerator (159) can be configured on an integrated circuit die that includes a controller (151) of the data storage device (112), or memory component (160, 161 or 163) of the data storage device (112).

The neural network accelerator (159) can be configured to perform computations, such as matrix arithmetic computations for ANN and/or or differential equation simulations for SNN, using data stored in the data storage device (112).

Examples of the matrix arithmetic computations include matrix multiplication and accumulation operations. After a computation to generate a result of the matrix arithmetic computations using a data stored in the data storage device (112), the neural network accelerator (159) can provide the result as output of the data storage device (112) in data retrieval operations (e.g., in response to a read command). Alternatively, or in combination, the result of the matrix arithmetic computation can be buffered in the data storage device (112) as operand for a next matrix computation performed in combination with a matrix of data retrieved from the non-volatile memory via a read command received in the host interface (157).

When the Artificial Neural Network (ANN) (125) includes a Spiking Neural Network (SNN), the neural network accelerator (159) can be configured to simulate a differential equation controlling activation levels of neurons in the Spiking Neural Network (SNN). Optionally, the memory component (160) is configured to store states of the neurons in the spiking neural network according to a predetermined pattern; and the neural network accelerator is configured to automatically update the states of the neurons over time according to the differential equation. For example, the neural network accelerator (159) can be configured to train the Spiking Neural Network (SNN) via unsupervised machine learning to detect anomaly.

The computations performed by the neural network accelerator (159) according to an Artificial Neural Network (ANN) (125) involve different types of data that have different patterns of usages of the data storage device (112).

For example, making a prediction using the Artificial Neural Network (ANN) (125) includes the use of data specifying the model of the Artificial Neural Network (ANN) (125), input data provided to the artificial neurons, and output data generated by the artificial neurons.

The memory capacity of the data storage device (112) can be partitioned into different portions for the different types of ANN-related data. The different portions can be separately configured to optimize the access and storage of the corresponding data according to their patterns of usages by the neural network accelerator (159) and/or the processor(s) (133) of the computer system (131) in which the data storage device (112) is configured.

The model of the Artificial Neural Network (ANN) (125) can include the parameters specifying the static attributes of individual artificial neurons in the ANN (125) and the neuron connectivity in the ANN (125). The model data of the ANN (125) is static and does not change during the prediction calculation made using the ANN (125). Thus, the usage pattern of the model data is mostly read. However, the model data of the ANN (125) can change when an updated ANN (125) is installed. For example, the vehicle (111) can download an updated ANN (125) from the server (119) to the data storage device (112) of the vehicle (111) to update its prediction capability. The model data of the ANN (125) can also change during or after the training of the ANN (125) using a machine learning technique (e.g., 171 or 175). It is preferred to configure a memory separate partition or region of the data storage device (112) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (125) can include external inputs and internal inputs. The external inputs are generated typically by the sensors (e.g., 122) of the vehicle (111) but not by artificial neurons in the ANN (125). The external inputs can be saved in a cyclic fashion so that the input data of the most recent time period of a predetermined length of driving can be found in the data storage device (112). Thus, it is preferred to configure a separate memory partition or region of the data storage device (112) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (125) can be buffered for further access by the neural network accelerator (159) and/or the processor(s) (133) of the computer system (131). The output data can include external outputs and internal outputs. The external inputs are generated by artificial neurons as the output from the ANN (125), such as the results of classifications or predictions made by the ANN (125). The output of the ANN (125) is typically further processed by the processor(s) (133) of the computer system (131). The external inputs may be saved periodically (e.g., in a way similar to the storing of the state variable data). The internal outputs and/or some of the external outputs can be internal inputs to artificial neurons in the ANN (125). In general, it may not be necessary to store the internal outputs from the buffer of the data storage device to the memory components. In some implementations, when the buffer capability of the data storage device (112) is insufficient to hold the entire state variable data and/or the internal outputs, the data storage device (112) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the data storage device (112). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 11:
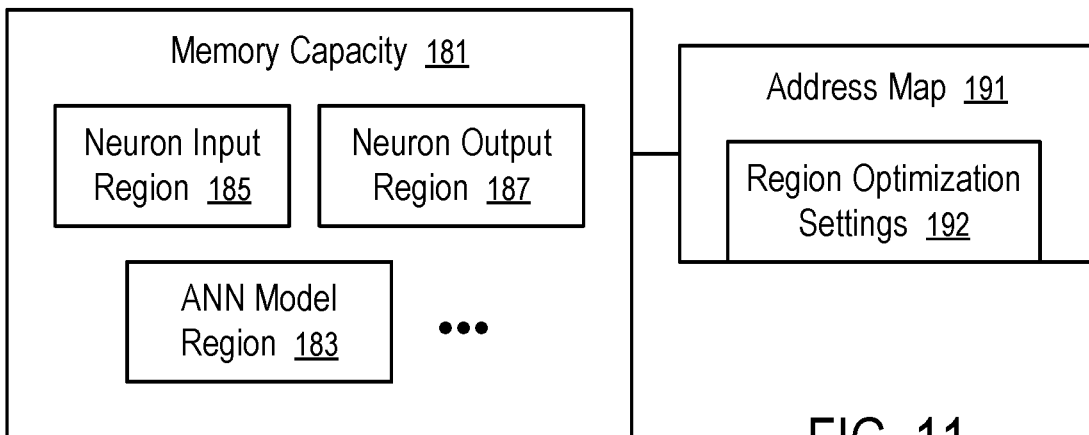
FIG. 11 shows a memory capacity configured to support neural network computations according to one embodiment.

FIG. 11 shows a memory capacity (181) configured to support neural network computations according to one embodiment. For example, the memory capacity (181) of the memory components (161 to 163) of the data storage device (112) of FIG. 9 can be configured according to FIG. 11 to support neural network computations.

The memory capacity (181) of FIG. 11 can be implemented using a set of memory components (e.g., 161 to 163) of the data storage device (112).

A set of regions (183, 185, 187, . . . ) can be created on the memory capacity (181) of the data storage device (112). Each of the region (e.g., 183, 185, or 187) corresponds to a named portion of the memory capacity (181). Logical addresses are defined within each region. An address map (191) is configured to map between the logical addresses defined in the regions (183, 185, 187, . . . ) to the physical addresses of memory units in the memory components (e.g., 161 to 163 illustrated in FIG. 9).

The address map (191) can include region optimization settings (192) for the regions (183, 185, and 187).

For example, an ANN model region (183) can be a memory/storage partition configured for the model data of the Artificial Neural Network (ANN) (125). The region optimization settings (192) optimizes the memory operations in the ANN model region (183) according to the data usage pattern of ANN models (e.g., mostly read, infrequent update centric).

For example, a neuron input region (185) can be a memory/storage partition configured for the external input data to the Artificial Neural Network (ANN) (125). The region optimization settings (192) optimizes the memory operations in the neuron input region (185) according to the data usage pattern of the external input data (e.g., for enhanced endurance supporting cyclic overwrite of continuous input data flow for sequential writes).

For example, a neuron output region (187) can be a memory/storage partition/configured for the external output data provided from the Artificial Neural Network (ANN) (125). The region optimization settings (192) optimizes the memory operations in the neuron output region (187) according to the data usage pattern of the external output data (e.g., improved endurance for periodically overwrite of data with random read/write access).

The data storage device (112) includes a buffer configured to store temporary/intermediate data of the Artificial Neural Network (ANN) (125), such as the internal inputs/outputs of the artificial neurons in the ANN (125).

Optionally, a swap region can be configured in the memory capacity (181) to extend the capacity of the buffer (152).

Optionally, the address map (191) includes a mapping between logic memory addresses received in the host interface (157) to access data of artificial neurons and the identities of the artificial neurons. Thus, a read or write command to access one type of data of an artificial neuron in one region can cause the controller 151 to access another type of data of the artificial neuron in another region.

For example, in response to a request to write external input data for a neuron into the memory capacity (181) of the data storage device (112), the address map (191) can be used to calculate the addresses of the model parameters of the neuron in the ANN model region (183) and read the model parameters into the buffer (152) to allow the neural network accelerator (159) to perform the computation of the output of the neuron. The output of the neuron can be saved in the buffer (152) as the internal input to other neurons (e.g., to reduce write amplification). Further, the identities of the other neurons connected to the neuron can also be retrieved from the ANN model region (183) into the buffer (152), which allows the neural network accelerator (159) and/or the processor to further process the propagation of the output in the ANN (125). The retrieval of the model data from the ANN model region (183) can be performed in parallel with the storing of the external input data into the neuron input region (185). Thus, the processors (133) of the computer system (131) of the vehicle (111) do not have to explicitly send in read commands for the retrieval of the model data from the ANN model region (183).

Similarly, in response to reading output data of a neuron, the address map (191) can be used to compute the addresses of the model parameters of the neuron stored in the ANN model region (183) and read the model parameters into the buffer (152) to allow the neural network accelerator (159) to apply internal inputs in the buffer (152) to the perform the computation of the output of the neuron. The computed output can be provided as a response to the reading of the output data for the neuron, without the data storage device (112) having to store the output data in the memory components (e.g., 161 to 163). Thus, the processors (133) and/or the neural network accelerator (159) can control the computations of the neuron via writing inputs to neurons and/or reading outputs from neurons.

In general, incoming external input data to the ANN (125) can be raw sensor data (121) generated directly by the sensors (e.g., 122) without processing by the processors (133) and/or the neural network accelerator (159). Alternatively, indirect sensor data (121) that has processed by the processors (133) for the ANN (125) from the signals from the sensors (122) can be provided as the external input data. The incoming external input data can be accepted in the host interface (157) and written in a cyclic way into the neuron input region (185), and automatically buffered in the buffer (152) for neural network accelerator (159) to generate neuron outputs using the model stored in the ANN model region (183). The outputs generated by the neural network accelerator (159) can be further buffered as internal inputs for further application of the model in the ANN model region (183). When the external outputs become available, the data storage device (112) can report the completion of the write requests with an indication of the availability of the external outputs. Optionally, the controller 151 and/or the neural network accelerator (159) can generate internal read commands to propagate signals in the ANN (125) in generating the external outputs. Alternatively, the host processors (133) can control the propagation of signals in the ANN (125) by selectively reading outputs of neurons; and the data storage device (112) can actively buffer data that may be needed in the buffer (152) to accelerate the ANN computation.

Figure 12:
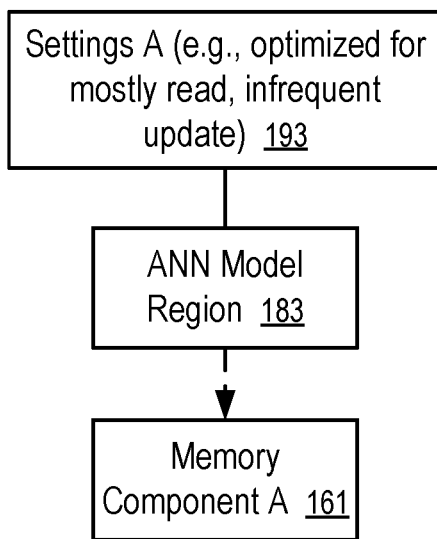
FIG. 12 illustrates the configuration of a memory region for an Artificial Neural Network (ANN) model according to one embodiment.

FIG. 12 illustrates the configuration of a memory region (183) for an Artificial Neural Network (ANN) model according to one embodiment. For example, the configuration of FIG. 12 can be implemented in the data storage device (112) of FIG. 9 with a logical memory capacity (181) of FIG. 11. For example, the settings (193) of FIG. 12 can be part of the region optimization settings (192) of FIG. 11.

The configuration of FIG. 12 maps an ANN model region (183) to at least one memory component A (161). Preferably, the at least one memory component A (161) can be used by the controller (151) in parallel with memory components (e.g., 163) that hosts the other regions (e.g., 185 and 187) of ANN data. For example, the memory component A (161) can be in an integrated circuit package that is separate from the integrated circuit packages for the other regions (e.g., 185 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 12, the settings (193) are optimized to the usage pattern of mostly read and infrequent update.

Figure 13:
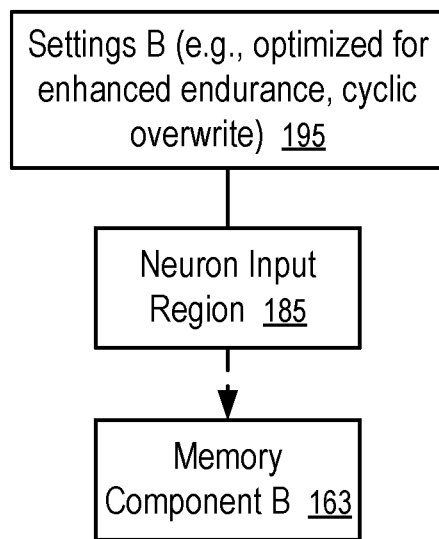
FIG. 13 illustrates the configuration of a memory region for the inputs to artificial neurons according to one embodiment.

FIG. 13 illustrates the configuration of a region (185) for the inputs to artificial neurons according to one embodiment. For example, the configuration of FIG. 13 can be implemented in the data storage device (112) illustrated in FIGS. 9 and/or 11. For example, the settings (195) of FIG. 13 can be part of the region optimization settings (192) of FIG. 11.

The configuration of FIG. 13 maps a neuron input region (185) to at least one memory component B (163). Preferably, the at least one memory component B (163) can be used by the controller (151) in parallel with memory components (e.g., 161) that hosts the other regions (e.g., 183 and 187) of ANN data. For example, the memory component B (163) can be in an integrated circuit package that is separate from the integrated circuit packages for the other regions (e.g., 183 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 13, the settings (195) are optimized to the usage pattern of enhanced endurance in cyclic sequential overwrite in recording a continuous stream of input data that is sampled at a fixed time interval.

Figure 14:
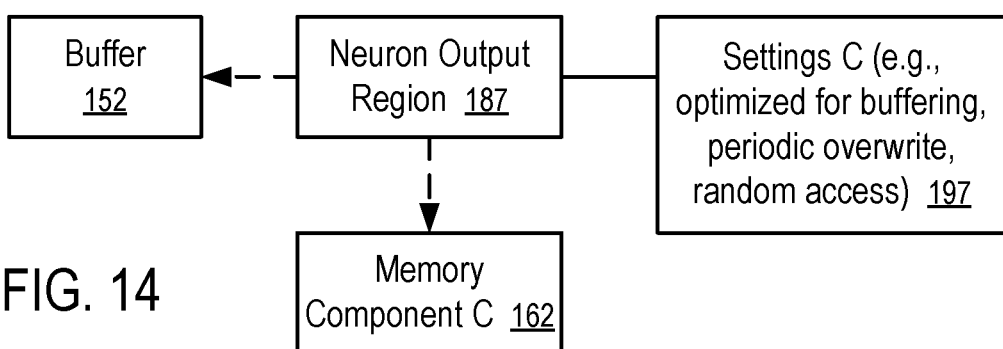
FIG. 14 illustrates the configuration of a memory region for the outputs from artificial neurons according to one embodiment.

FIG. 14 illustrates the configuration of a region (187) for the outputs from artificial neurons according to one embodiment. For example, the configuration of FIG. 12 can be implemented in the data storage device (112) illustrated in FIGS. 9 and/or 11. For example, the settings (197) of FIG. 12 can be part of the region optimization settings (192) of FIG. 11.

The configuration of FIG. 14 maps a neuron output region (187) to at least one memory component C (162). Preferably, the at least one memory component C (162) can be used by the controller (151) in parallel with memory components (e.g., 161 and 163) that hosts the other regions (e.g., 183 and 185) of ANN data. For example, the memory component C (162) can be in an integrated circuit package that is separate from the integrated circuit packages for the other regions (e.g., 183 and 185). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 14, the settings (197) are optimized to the usage pattern of buffered data for periodic overwrite with random access. For example, memory units are configured via the optimization settings (193 to 197) to update/overwrite in the neuron output region (187) at a frequency higher than in the ANN model region (183), but lower than in the neuron input region (185).

A communication protocol/interface can be configured to allow a data storage device to perform neural network acceleration on the fly with reduced data traffic to the host system.

For example, the host processor (e.g., 133) of a vehicle (111) can provide write commands to the data storage device (112) to store the model of an artificial neural network in a model partition (e.g., 183).

To use the ANN model in classifications and/or predictions, the host processor (e.g., 133) of a vehicle (111) can optionally stream input data for the ANN (125) into the neuron input partition (e.g., 185). The neural network accelerator (159) of the storage device (112) can automatically apply the images from the sensors (122) and, if there is any, the input data from the host processor (133) to the model stored in ANN model partition (e.g., 183) in accordance with the address map (191). The data storage device (112) makes the computed outputs available for propagation in the ANN (125). Preferably, the computed outputs are made available to the neural network accelerator (159) through the buffer (152) without the need to store the intermediate outputs into memory components (e.g., 161 to 163). Thus, the data communications between the host processor (e.g., 133) and the data storage device (112) for the transporting of outputs of neurons can be reduced. When the outputs have propagated to the output neurons in the ANN (125), the data storage device (112) can provide a response to a request from the host processor (e.g., 133). The response indicates that the external output from neurons in the ANN (125) is available. In response, the host processor (e.g., 133) of a vehicle (111) can optionally issue read commands to retrieve the external outputs for further processing.

Figure 15:
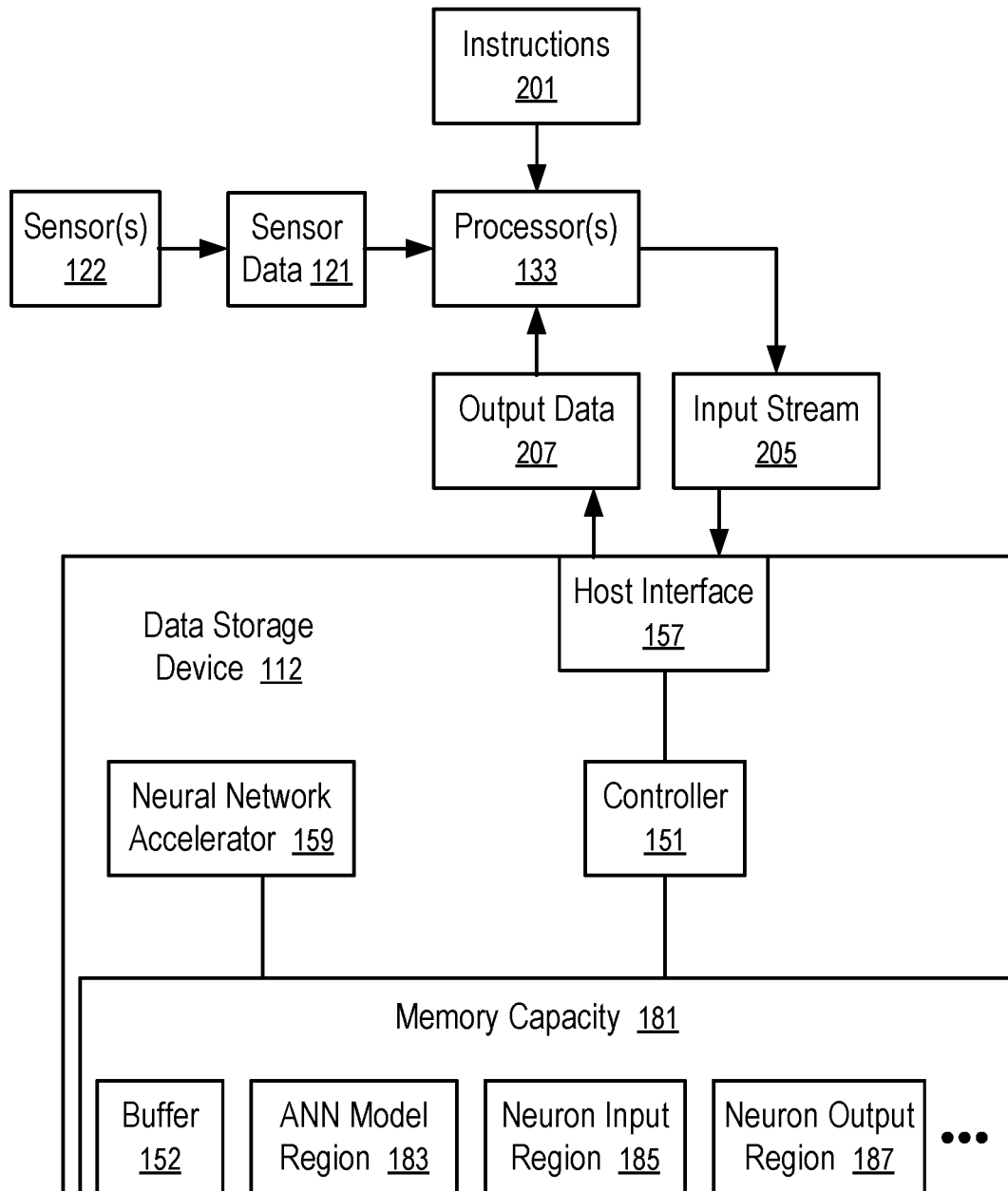
FIG. 15 shows communications between an autonomous vehicle and a data storage device according to one embodiment.

FIG. 15 shows communications between an autonomous vehicle (111) and a data storage device (112) according to one embodiment. For example, the communications as illustrated in FIG. 15 can be implemented in the vehicle (111) of FIG. 4 or 5, with a data storage device (112) illustrated in FIG. 9.

In FIG. 15, the processor(s) (133) of the host system can be configured with a simplified set of instructions (201) to perform neural network computation, since some of the computations involving the ANN (125) is performed by the neural network accelerator (159) within the data storage device (112). It is not necessary to transport the model data back to the processor(s) (133) during the use of the ANN (125) for predictions and/or classifications.

The sensors (122) can generate a continuous input stream (205) as part of sensor data (121) for the vehicle (111). The sensor data (121) in the input stream (205) can be generated at a fixed, predetermined time interval (e.g., during the operation of the vehicle (111)).

The input stream (205) is applied to input neurons in the ANN (125). Input neurons in the ANN (125) are configured to accept external inputs to the ANN (125); and output neurons are configured to provide external outputs from the ANN (125).

The processor(s) (133) can execute the instructions (201) to process the output data (207) from the data storage device (112) and some of the sensor data (121).

For example, the processor(s) (133) can write the sensor data (121) as part of the input stream (205) into the neuron input region (185) and read from the neuron output region (187) the output data (207) generated by the neural network accelerator (159) using the ANN data in the model region (183).

The data storage device (112) stores the input stream (205) into the neuron input region (185) in a cyclic way where the oldest input set corresponding to the oldest time instance of data sampling for data sets currently stored in the neuron input region (185) is erased to store the newest set of inputs.

For each input data set, the neural network accelerator (159) applies the model of the ANN (125) stored in the ANN model region (183). The neural network accelerator (159) (or the processor(s) (133)) can control the propagation of signals within the neural network. When the output neurons of the ANN (125) generate their outputs responsive to the input data set, the data storage device (112) can provide to the processor (133) an indication that the neuron outputs are ready for retrieval. The indication can be configured in a response to the request from the processor(s) (133) to write the input data set into the neuron input region (185). The processor(s) (133) can optionally retrieve the output data (207) (e.g., in accordance with conditions and/or criteria programmed in the instructions).

In some embodiments, a trigger parameter is configured in the data storage device (112). When an output parameter in the external output (217) meetings a requirement specified by the trigger parameter, the data storage device provides the response to the request from the processor(s) (133) to write the input data set into the neuron input region (185).

Figure 16:
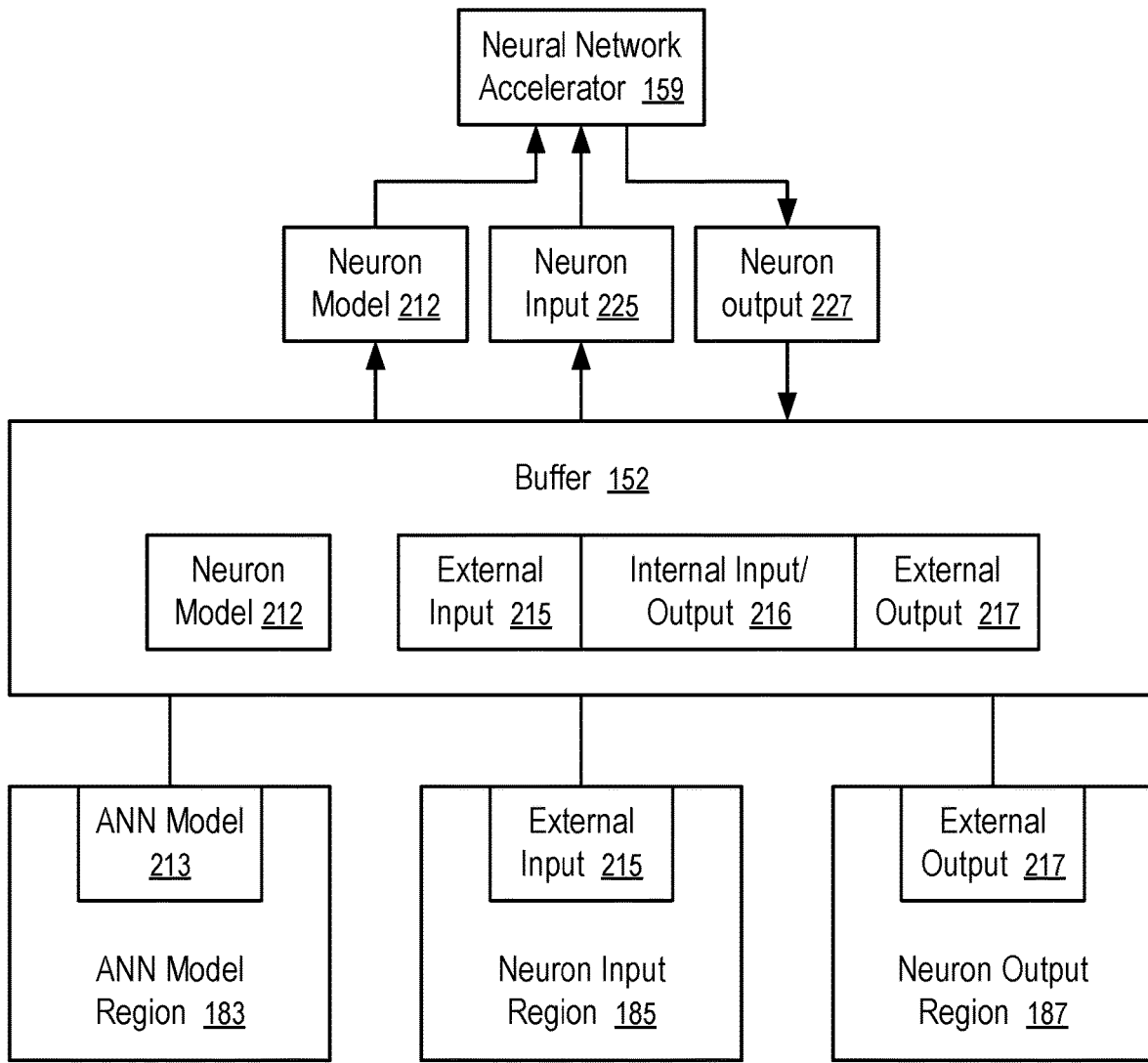
FIG. 16 shows communications within a data storage device according to one embodiment.

FIG. 16 shows communications within a data storage device (112) according to one embodiment. For example, the communications of FIG. 16 can be implemented a data storage device (112) illustrated in FIG. 9.

In FIG. 16, the model region (183) stores the model (213) of an ANN (125). In response to receiving a set of external input (215) for a time instance from the input stream (205) in the buffer (152), the data storage device (112) can write the external input (215) into the input region (185) in parallel with retrieving a neuron model (212) containing a portion of the ANN model (213) corresponding to the parameters of the input neurons and/or the identities of neurons connected to the input neurons. The buffer (152) allows the neural network accelerator (159) to combine the neuron model (212) and the external input (225) to generate the output (227) of the input neurons.

In general, the neuron output (227) can include a portion that is the internal output (216) for further propagation within the ANN (125) and/or a portion that is the external output (217) for the processor(s) (133).

The internal output (216) is stored in the buffer (152) as internal input (216) for further propagation in the ANN (125) in a way similar to the generation of neuron outputs (227) from the external input (215). For example, a portion of the internal input (216) can cause the controller (151) and/or the neural network accelerator (159) to retrieve corresponding neuron model (212) relevant to the internal input such that the internal input is applied in the neural network accelerator (159) to the corresponding neuron model (212) to generate their neuron outputs (227).

When the complete set of external output (217) is available in the buffer (152), the external output (217) can be stored into the output region (187).

Optionally, the storage device (112) does not store each set of external output (217) corresponding to a set of stored external input (215) sampled at a time instance. For example, the storage device (112) can be configured to store one set of external output (217) every time when a predetermined number of sets of external input (e.g., 215) has been counted. Alternatively, or in combination, the processor(s) (133) can determine whether or not to store the external output (217). For example, the storage device (112) can be configured to store the external output (217) in response to the processor(s) (133) retrieving the external output (217) for further processing. For example, the storage device (112) can be configured to store the external output (217) in response to a write command from the processor(s) (133) after the processing of the external output (217) in the processor(s) (133).

The server (119), the computer system (131), and/or the data storage device (112) can each be implemented as one or more data processing systems.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system (e.g., 131 and/or 119) causes the system to perform various methods discussed above (e.g., the method of FIG. 2 and/or the method of FIG. 3). The executable software and data may be stored in various places including for example ROM, volatile RAM, non-volatile memory and/or cache discussed above (e.g., 112, 135, and/or 152). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
monitoring, using a camera configured in a vehicle, an item associated with a user of the vehicle;
recognizing the item in an image from the camera by using an artificial neural network to process the image;
determining that the item recognized in the image is left in the vehicle after the user has exited the vehicle;
generating an alert in response to a determination that the item is in the vehicle and the user is not in the vehicle;
receiving responses of the user responsive to alerts generated to indicate items being left by the user in the vehicle;
training the artificial neural network based on the responses; and
predicting, using artificial neural network, an intent of the user to leave the item in the vehicle, wherein the alert is provided in response to a prediction that the user does not intend to leave the item in the vehicle.

2. The method of claim 1 further comprising:
detecting that the user exits the vehicle;
wherein the alert is provided in response to closing a door of the vehicle after the user exits the vehicle.

3. The method of claim 1, further comprising:
monitoring movements of the user outside of the vehicle;
wherein the alert is provided in response to a determination that, based on the monitoring of the movements of the user, the user is traveling away from the vehicle.

4. The method of claim 1, wherein the alert is provided in response to a command to lock the vehicle after the user exits the vehicle.

5. The method of claim 1, wherein the recognizing of the item includes classifying, using the artificial neural network, the item in a category in a plurality of predefined categories.

6. The method of claim 5, wherein the alert includes an image of the item in the vehicle transmitted to a mobile device of the user after the user is away from the vehicle.

7. The method of claim 5, wherein the category is child or pet.

8. The method of claim 7, wherein the monitoring of the item includes capturing an image of the user approaching the vehicle with the item before the user enters the vehicle.

9. The method of claim 7, wherein the monitoring of the item includes capturing an image of the user in the vehicle with the item that is absent from the vehicle before the user enters the vehicle.

10. The method of claim 7, wherein the alert is generated using a horn of the vehicle, or an infotainment system of the vehicle, or any combination thereof.

11. The method of claim 10, further comprising:
continuing the alert until the vehicle receives an indication of a decision of the user to leave the item in the vehicle.

12. The method of claim 11, wherein the indication identifies a time period for suppressing the continuing of the alert; and the method further comprises:
resuming the alert after the time period in response to a determination that, after the time period, the item remains in the vehicle and the user is not in the vehicle.

13. The method of claim 1, further comprising:
determining an identity of the user; and
transmitting the alert to a mobile device of the user using contact information associated with the user.

14. The method of claim 13, further comprising:
establish a communication channel from the mobile device to the vehicle to facilitate voice communications between a child left in the vehicle and the user away from the vehicle.

15. A data storage device, comprising:
one or more memory components configured to store data;
an interface configured to receive, from a camera configured in a vehicle, images to monitor an item associated with a user of the vehicle;
an inference engine configured to recognize, using an artificial neural network, the item in the images from the camera;
a controller configured to:
determine that the item recognized in the images is left in the vehicle after the user has exited the vehicle,
predict, using the artificial neural network, an intent of the user to leave the item in the vehicle, and
in response to a prediction that the user does not intend to leave the item in the vehicle, cause the vehicle to generate an alert including an image of the item in the vehicle and transmit the alert to a mobile device of the user after the user is away from the vehicle.

16. The data storage device of claim 15, wherein the inference engine includes a neural network accelerator configured to perform matrix arithmetic computations more efficiently than the controller.

17. The data storage device of claim 15, wherein the interface is configured to receive the images to monitor the item, including at least an image of the user approaching the vehicle with the item before the user enters the vehicle.

18. The data storage device of claim 15, wherein the interface is configured to receive the images to monitor the item, including at least an image of the user in the vehicle with the item that is absent from the vehicle before the user enters the vehicle.

19. A vehicle, comprising:
an Advanced Driver Assistance System (ADAS) having one or more cameras; and
a computer system configured to:
receive, from a camera of the ADAS, images to monitor an item associated with a user of the vehicle;
recognize, using an artificial neural network, the item in the images from the camera;
determine that the item recognized in the images is left in the vehicle after the user has exited the vehicle;
determining an identity of the user;
transmitting the alert to a mobile device of the user using contact information associated with the user;
provide an alert in response to a determination that the item is in the vehicle and the user is not in the vehicle; and
establish a communication channel from the mobile device to the vehicle to facilitate voice communications between a child left in the vehicle and the user away from the vehicle.

20. The vehicle of claim 19, wherein the alert is provided via a horn of the vehicle, or an infotainment system of the vehicle, or any combination thereof.

21. The vehicle of claim 20, wherein the alert is provided via a communication to a mobile device separate from the vehicle, wherein the mobile device is pre-associated with the user, a driver of the vehicle, or an owner of the vehicle.

22. The vehicle of claim 19, wherein the computer system is configured to monitor the item via at least capturing an image of the user approaching the vehicle with the item before the user enters the vehicle.

23. The vehicle of claim 19, wherein the computer system is configured to monitor the item via at least capturing an image of the user in the vehicle with the item that is absent from the vehicle before the user enters the vehicle.

* * * * *